(12) United States Patent
Thouement et al.

(10) Patent No.: US 10,743,144 B2
(45) Date of Patent: Aug. 11, 2020

(54) TRAJECTORY DETERMINING DEVICE

(71) Applicant: INTERSEC, Paris la Defense (FR)

(72) Inventors: Sebastien Thouement, Paris (FR);
Pierre-Louis Cuny, Neuilly sur Seine (FR); Jean-Marc Coic, Bourg la Reine (FR)

(73) Assignee: INTERSEC, Paris la Defense (FR)

( * ) Notice: Subject to any disclaimer, the term of this patent is extended or adjusted under 35 U.S.C. 154(b) by 0 days.

(21) Appl. No.: 16/487,992

(22) PCT Filed: Feb. 13, 2018

(86) PCT No.: PCT/FR2018/050347
§ 371 (c)(1),
(2) Date: Aug. 22, 2019

(87) PCT Pub. No.: WO2018/154217
PCT Pub. Date: Aug. 30, 2018

(65) Prior Publication Data
US 2020/0029174 A1    Jan. 23, 2020

(30) Foreign Application Priority Data

Feb. 23, 2017  (FR) .................................... 17 51454
Jul. 31, 2017   (FR) .................................... 17 57289

(51) Int. Cl.
*H04W 24/00*    (2009.01)
*H04W 4/029*    (2018.01)
*H04W 4/02*     (2018.01)

(52) U.S. Cl.
CPC .......... *H04W 4/029* (2018.02); *H04W 4/027* (2013.01)

(58) Field of Classification Search
None
See application file for complete search history.

(56) References Cited

U.S. PATENT DOCUMENTS

| | | | |
|---|---|---|---|
| 10,292,014 B2* | 5/2019 | Coic ..................... | H04W 4/029 |
| 10,419,885 B2* | 9/2019 | Coic ..................... | H04W 4/021 |
| 2014/0114561 A1 | 4/2014 | Pakzad et al. | |
| 2015/0079932 A1* | 3/2015 | Zelinka ................ | H04W 4/029 |
| | | | 455/411 |

FOREIGN PATENT DOCUMENTS

WO    2017021600 A1    2/2017

* cited by examiner

*Primary Examiner* — Erika A Washington
(74) *Attorney, Agent, or Firm* — Volpe and Koenig, P.C.

(57) ABSTRACT

A trajectory determining device is designed for determining trajectory data (10) based on signaling data associating mobile communication device identifiers, time markers and signaling identifiers, at least some of the signaling identifiers designating a location cell. These trajectory data are used in order to identify pairs of movement markers associated with a same mobile communication device identifier, and corresponding signaling data, the time markers of which are between the time markers of a given pair, are reprocessed in order to return classified movement data (16) associating movement type data and departure and arrival data determined from location cells associated with the signaling data and a group of chosen locations.

12 Claims, 4 Drawing Sheets

TRAJECTORY DETERMINING DEVICE

INVENTIVE FIELD

The invention relates to the field of trajectory detection, more particularly in a passive manner, from signaling data associated with a mobile device.

BACKGROUND

It is complex to determine the flow of people moving between various locations. For a given location, it is possible to determine flows statistically, by measuring humanely the number of people entering and exiting. However, these methods are not very reliable, are high cost, and are lacking in contextual information. Indeed, it is not possible to know what the place of origin of the people counted is, what the means of transport used are, etc.

SUMMARY

The aim of the invention is to improve the situation. For this purpose, the invention provides a trajectory determination device, comprising a memory for receiving signaling data associating communications mobile device identifiers, time markers and signaling identifiers, at least some of the signaling identifiers designating a localization cell, a classifier capable, for a given communications mobile device identifier, of marking the signaling data which are associated with a movement marker indicating a state chosen from amongst a list comprising at least one movement and one short stop, and an analyzer capable of processing the signaling data marked according to the movement markers in order to produce trajectory data associating, on the one hand, a given communications mobile device identifier and, on the other, a series of movement markers each associated with a localization cell and with a time marker, such that two movement markers whose time markers indicate that they are consecutive denote distinct states, by applying at least one of the following rules:

a) the modification of any given movement markers into movement markers indicating a short stop, when, for two movement markers indicating a short stop associated with a single localization cell, the number of movement markers whose time markers indicate that they are between these two movement markers is less than or equal to 4, b) the modification of movement markers indicating a movement into movement markers indicating a short stop when the time markers associated with them indicate that they are preceded and followed by movement markers indicating a short stop and that the time markers associated with the latter indicate a duration shorter than a first threshold, c) the modification of movement markers indicating a movement into movement markers indicating a short stop when the time markers associated with them indicate that they are preceded and followed by movement markers indicating a short stop which are associated with the same localization cell and that the time markers associated with the latter indicate a duration shorter than a second threshold, d) the modification of movement markers indicating a short stop into movement markers indicating a movement when the time markers associated with them indicate that they are preceded and followed by movement markers indicating a movement and that the time markers associated with the latter indicate a duration shorter than a third threshold, e) the merging of movement markers indicating a short stop whose time markers indicate that they are consecutive, and the association with the resulting movement marker of the localization cell associated with the movement markers whose time markers represent the longest duration and of a time marker corresponding to the sum of the durations of the associated time markers.

This device furthermore comprises an extractor configured for determining, from amongst the trajectory data, pairs of movement markers associated with the same communications mobile device identifier the time markers of which and the associated localization cells of which define a duration exceeding a first threshold and a distance exceeding a second threshold, and, for a given pair of movement markers, for grouping into a candidate set the signaling data associated with the corresponding communications mobile device identifier and the time markers of which are in the range between the two time markers of the given pair of movement markers, and a detector configured for determining, within a given candidate set, whether signaling data associated with time markers meet one of the following conditions:

I) the signaling data define a movement speed greater than a third threshold, and the corresponding time markers are separated by a duration greater than a fourth threshold, II) the time markers of the signaling data are separated by a duration greater than a fifth threshold higher than the fourth threshold, the associated signaling identifiers indicate an absence of activity, the signaling data define a movement speed greater than the speed defined by the division of the first threshold by the second threshold.

The detector is configured, when one of the conditions I) and II) is met, for returning classified movement data associating data of the movement type and departure and arrival data determined from the localization cells associated with the signaling data and from a group of chosen locations.

This device is very advantageous because it allows trajectories to be determined, in a passive manner, from the signaling data from the communications devices. This determination is reliable, automatable and inexpensive in human resources. Moreover, it allows a statistical processing enabling a certain amount of contextual information to be qualified.

In some variants, the device could have one or more of the following features:

when the condition II) is met, the detector is configured for verifying that the associated localization cells or those of signaling data the time markers of which are close in time designate a location belonging to a group of chosen locations prior to returning classified movement data, the classifier and the analyzer are called up sequentially for producing trajectory data, the analyzer applies the rule a) before applying the rule b),
the analyzer applies the rule b) before applying the rule c),
the analyzer applies the rule c) before applying the rule d),
the analyzer applies one of the rules a), b), c) and d) before applying the rule e), and the detector is configured for determining whether one of the conditions I) and II) is applicable to signaling data situated between time markers associated with classified movement data, and for repeating this determination on the resulting classified movement data until neither of the conditions I) and II) is met.

The invention also relates to a trajectory determination method comprising the following operations:

a) receive signaling data associating communications mobile device identifiers, time markers and signaling identifiers, at least some of the signaling identifiers designating a localization cell, b) for a given communications mobile device identifier, mark the signaling data associated with it with a movement marker indicating a state chosen from amongst a list comprising at least one movement and one short stop, c) process the signaling data marked according to the movement markers in order to produce trajectory data associating, on the one hand, a given communications mobile device identifier and, on the other, a series of movement markers each associated with a localization cell and with a time marker, such that two movement markers whose time markers indicate that they are consecutive denote distinct states, by applying at least one of the following rules:

c1) the modification of any given movement markers into movement markers indicating a short stop when, for two movement markers indicating a short stop associated with a single localization cell, the number of movement markers whose time markers indicate that they are between these two movement markers is less than or equal to 4, c2) the modification of movement markers indicating a movement into movement markers indicating a short stop when the time markers associated with them indicate that they are preceded and followed by movement markers indicating a short stop and when the time markers associated with the latter indicate a duration shorter than a first threshold, c3) the modification of movement markers indicating a movement into movement markers indicating a short stop when the time markers associated with them indicate that they are preceded and followed by movement markers indicating a short stop which are associated with the same localization cell and when the time markers associated with the latter indicate a duration shorter than a second threshold, c4) the modification of movement markers indicating a short stop into movement markers indicating a movement when the time markers associated with them indicate that they are preceded and followed by movement markers indicating a movement and when the time markers associated with the latter indicate a duration shorter than a third threshold, c5) the merging of movement markers indicating a short stop whose time markers indicate that they are consecutive, and the association with the resulting movement marker of the localization cell associated with the movement mark whose time markers represent the longest duration and of a time marker corresponding to the sum of the durations of the associated time markers, d) determine, from the trajectory data, pairs of movement markers associated with the same communications mobile device identifier the time markers of which and the associated localization cells of which define a duration exceeding a first threshold and a distance exceeding a second threshold, and, for a given pair of movement markers, for grouping into a candidate set the signaling data associated with the corresponding communications mobile device identifier and the time markers of which are in the range between the two time markers of the given pair of movement markers, e) determine, within a given candidate set, whether signaling data associated with time markers meet one of the following conditions:

I) the signaling data define a movement speed greater than a third threshold, and the corresponding time markers are separated by a time period greater than a fourth threshold, II) the time markers of the signaling data are separated by a time period greater than a fifth threshold greater than the fourth threshold, the associated signaling identifiers indicate an absence of activity, the signaling data define a movement speed greater than the speed defined by the division of the first threshold by the second threshold, f) when one of the conditions I) and II) is met, return classified movement data (16) associating data on movement type and departure and arrival data determined from the localization cells associated with the signaling data and from a group of chosen locations.

In certain variants, the method could exhibit one or more of the following features:

the condition II) furthermore comprises verifying that the associated localization cells or those of signaling data the time markers of which are close in time designate a location belonging to a group of locations prior to returning classified movement data, the operation c) applies the rule c1) before the rule c2), the operation c) applies the rule c2) before applying the rule c3), the operation c) applies the rule c3) before applying the rule c4), the operation c) applies one of the rules c1), c2), c3) and c4) before applying the rule c5), the operations c), d), e) and f) are carried out in this order, and the operation e) is repeated on signaling data situated between time markers associated with classified movement data, and also on the resulting classified movement data, until neither of the conditions I) and II) are met.

The invention also relates to a computer program product comprising portions of program code for implementing the device or the method according to the invention.

BRIEF DESCRIPTION OF THE DRAWINGS

Other features and advantages of the invention will become more clearly apparent upon reading the description that follows, taken from examples given by way of non-limiting illustration and taken from the drawings in which.

DETAILED DESCRIPTION OF THE PREFERRED EMBODIMENTS

The drawings and the description hereinafter contain, for the most part, elements that are certain in nature. They will therefore not only be able to be used to aid the understanding of the present invention, but also to contribute to its definition, where appropriate.

The present description could, by its very nature, involve elements subject to copyright protection. The holder of the rights has no objection to the identical reproduction by whomsoever of the present patent document or of its description, such as it appears in the official dossiers. For the rest, all rights are reserved.

Figure 1:
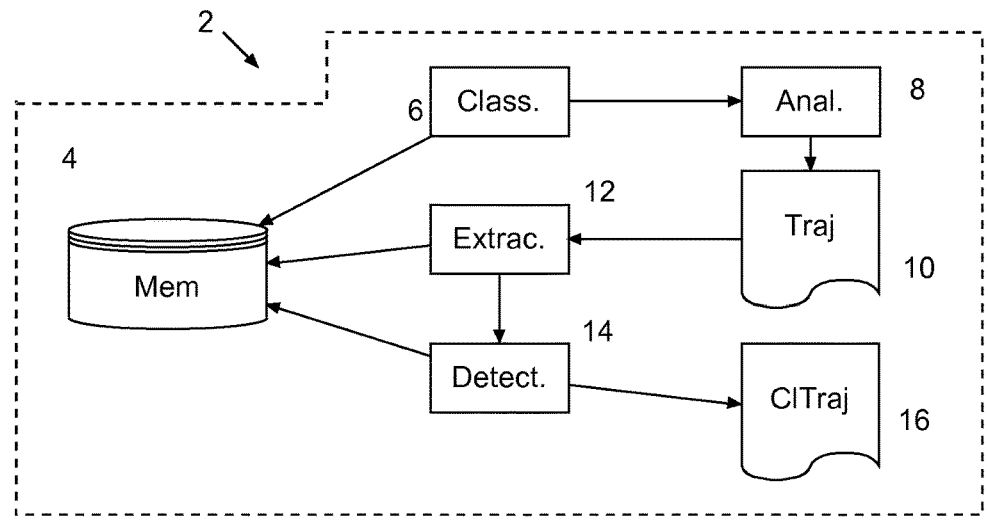
FIG. 1 shows a schematic view of a device according to the invention.

FIG. 1 shows a schematic view of a trajectory determining device according to the invention.

The device 2 comprises a memory 4, a classifier 6 and an analyzer 8, which together produce trajectory data 10. The device 2 furthermore comprises an extractor 12 and a detector 14 which process the trajectory data 10 and the data received in the memory 4 for producing classified movement data 16.

In the example described here, the classifier 6, the analyzer 8, the extractor 12 and the detector 14 are elements directly or indirectly accessing the memory 4. They may be implemented in the form of a suitable computer code executed on one or more processors. The term "processor" should be understood as any processor adapted to the calculations described hereinafter. Such a processor may be implemented in any known manner, in the form of a microprocessor for personal computer, of a dedicated chip of the FPGA or SoC (System-on-a-Chip) type, of a computing resource on a grid, of a microcontroller, or any other form able to supply the processing power necessary for the embodiment described hereinbelow. One or more of these elements may also be implemented in the form of specialized electronic circuits such as an ASIC. A combination of a processor and of electronic circuits may also be envisioned.

In the example described here, the memory 4 receives data from a mobile telephony operator (whether this be via GSM, GPRS, EDGE, UMTS, LTE, or their developments, or else a wide-area WiFi network of the "hotspot" type). The memory 4 contains all of the signaling and activity data for one, several or all the geographical areas served by the operator. The memory 4 may be directly accessible or remote, distributed over one or more sites, or correspond to the aggregation of several separate storages, including belonging to several operators pooling their resources. The memory 4 may be any type of data storage able to receive digital data: hard disk, solid-state hard disk (or SSD), flash memory in any form, RAM memory, magnetic disk, storage distributed locally or in the cloud, etc. The data calculated by the device may be stored in any type of memory similar to the memory 4, or in the latter. This data may be deleted after the device has performed its tasks or saved.

The signaling data associates a communications mobile device identifier, a signaling identifier and a time marker. The time marker may be a raw marker or may be accompanied by a duration. The communications mobile devices may be any device able to connect to a GSM, GPRS, EDGE, UMTS, LTE mobile telephony network or their developments, or to a wide-area WiFi network of the "hotspot" type. The signaling identifiers may be extracted from any signaling over these networks, or from a triangulation using these identifiers, and/or from data of the GPS type communicated by the device.

In a first step, the device 2 will analyze the signaling data associated with each mobile device identifier in order to add a movement marker to the localization cell corresponding to the signaling identifiers and to the associated time markers. This triplet constitutes what will henceforth be referred to as an event.

Figure 2:
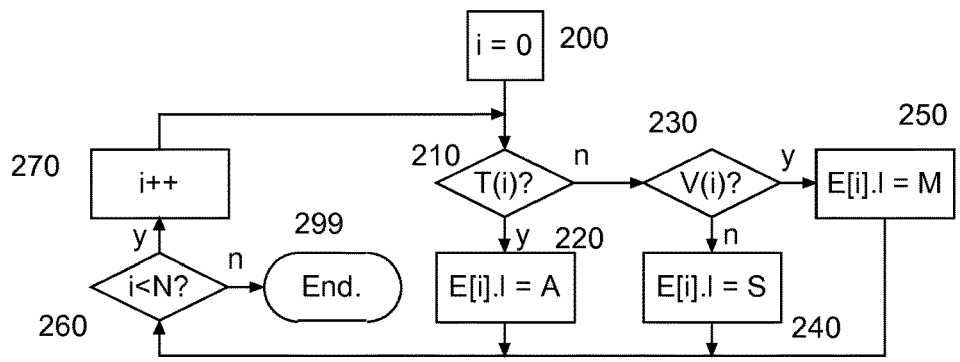
FIG. 2 shows one exemplary implementation of a function by the classifier in FIG. 1, FIGS. 3 to 7 show exemplary implementations of functions by the analyzer in FIG. 1.

FIG. 2 shows one example of a function implemented by the classifier 6 in order to carry this out.

In an operation 200, the classifier 6 resets a loop index i to 0. Subsequently, in an operation 210, a function T( ) is executed for analyzing the time marker associated with the signaling identifier of index i. The function T( ) determines the time that has passed between the time marker associated with the signaling identifier of index i and the preceding marker. If the time period is greater than a chosen threshold (for example greater than 4 hours, or 6 hours, or more), then in an operation 220, a movement marker of the long-stop type is associated with the localization cell and with the time marker associated with the signaling identifier of index i.

The time markers of the long-stop type are important because they are used to "cut up" the series of events. Thus, all the processing operations described hereinafter relate to sequences of events situated between two events indicating a long stop. In any case, as soon as a long stop is detected, two sequences are generated which will be processed independently.

Otherwise, in an operation 230, a function V( ) is executed for determining the difference of location between the localization cell associated with the signaling identifier of index i and that associated with the signaling identifier of preceding index i. If the function V( ) indicates that the movement speed between these localization cells is less than a threshold speed (equal to around 10 km/h for example), then in an operation 240, a movement marker of the short-stop type is associated with the localization cell and with the time marker associated with the signaling identifier of index i. Otherwise, in an operation 250, a movement marker of the movement type is associated with the localization cell and with the time marker associated with the signaling identifier of index i. Thus, the events designate pairs of signaling identifiers associated with the same communications mobile device and consecutive in time, and an event is only of the movement type if the perceived movement speed is faster than walking speed. As a variant, the function V( ) could determine whether the localization cell has not changed between the two successive signaling identifiers instead of it being based on the movement speed.

After the association of a marker by one of the operations 220, 240 or 250, an operation 260 tests whether all the signaling identifiers have been processed. If this is not the case, the index i is incremented in an operation 270. Otherwise, the function ends in an operation 299.

Once all the data values have been marked, the device 2 can carry out their processing. Indeed, many signaling data values may not represent a movement of a person. For example, a communications device may be surrounded by several antennas, and for various reasons attach itself successively to various of these antennas, without however moving. In this case, the signaling data will indicate separate localization cells, which suggests a movement, whereas the communications device (and hence its user) has not moved. Numerous other scenarios which add noise may exist and must be processed in order to obtain reliable trajectory data.

The examples of functions shown in FIGS. 3 to 7 show how the analyzer 8 processes the marked data in order to extract trajectory data from it.

Figure 3:
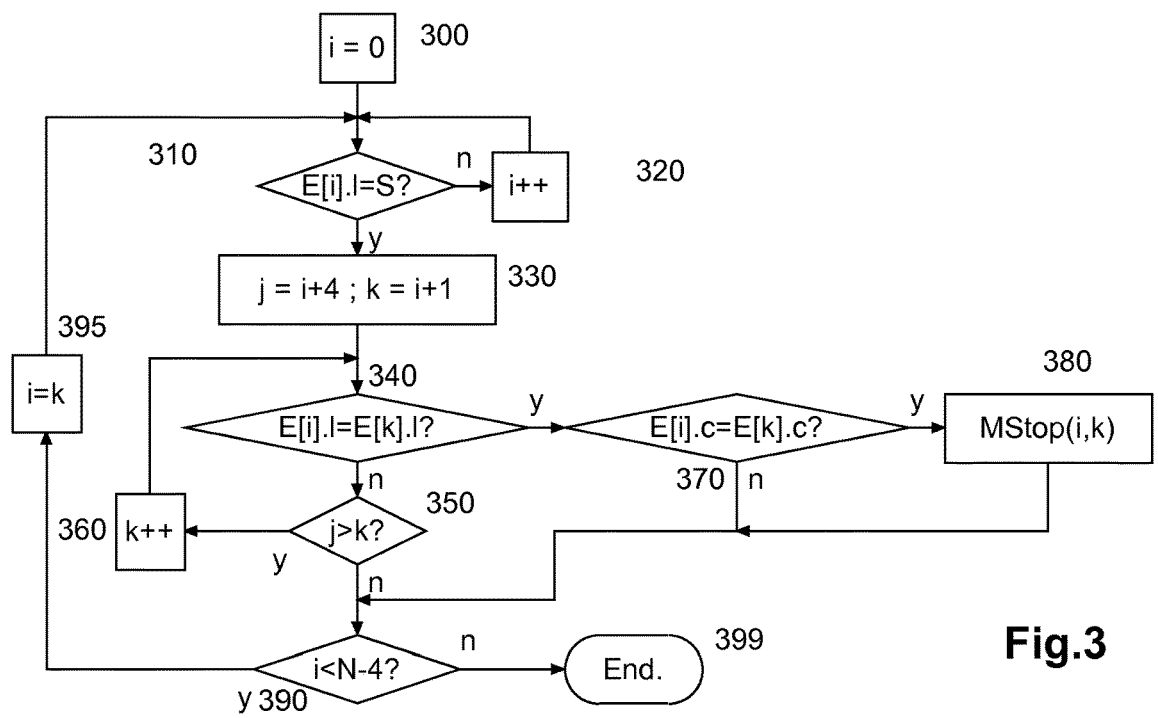

FIG. 3 shows one exemplary implementation of a first function. This function relates to the case described hereinabove. Thus, when, between two localization data values, the movement marker of which indicates a short stop in the same localization cell and which are separated by less than four events, all the movement markers are converted into short stops.

Thus, in an operation 300, a loop index i is reset to 0. Subsequently, in an operation 310, a test is carried out in order to determine whether the event of index i has a movement marker E[i].1 which indicates a short stop or not. For as long as this is not the case, the index i is incremented in an operation 320 and the test of the operation 310 is repeated.

As soon as a short stop is detected, an index j is defined as the value i with 4 added, and a loop index k is defined as the value i with 1 added in an operation 330. Subsequently, a loop determines whether there exists an event between i and j which is also a short stop. For this purpose, a test is carried out in an operation 340. For as long as this test is not positive, a test in an operation 350 verifies that k is less than j, and k is incremented in an operation 360.

When a short stop is found, a test in an operation 370 verifies whether the two events E[i] and E[k] share the same localization cell. If this is the case, then there are indeed two events with a movement marker of the short-stop type and which are separated by less than four events. Then, a function MStop( ) receiving i and k as arguments transforms all the movement markers E[n].l into short stops, with n included between i and k.

Subsequently, or when the operation 350 determines that there is no event of the short-stop type at less than 4 events from the event i, or when the localization cells of the event i and that of the event k are separate cells, a test in an operation 390 verifies whether there still remain 4 operations for relaunching a loop. If yes, then in an operation 395 the index i is updated with the index k and the loop continues with the operation 310. Otherwise, the function ends in an operation 399.

Figure 4:
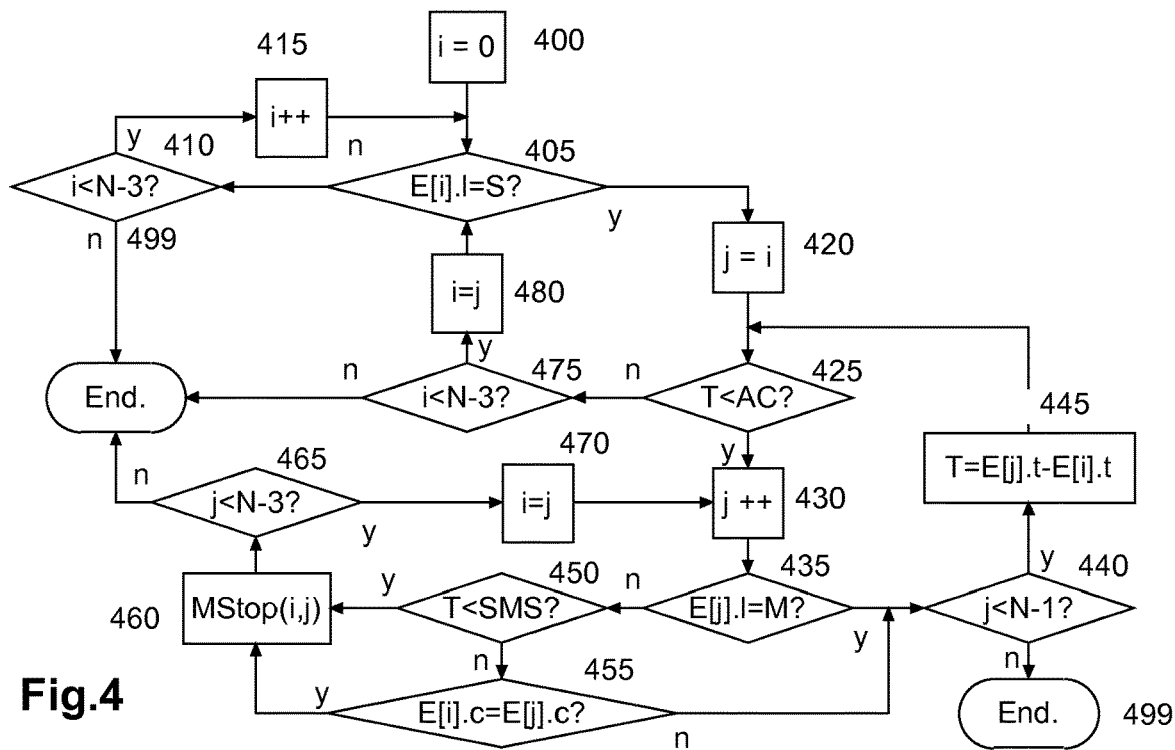

FIG. 4 shows another example of a function implemented by the analyzer 8. Indeed, when two events whose movement markers indicate a short stop are separated by a time period, and when these events are separated by a period shorter than a first threshold allowing the passage from one cell to another, or when the two events are associated with the same localization cell but their time markers are separated by a time period greater than a second threshold indicating that the return trip to a neighboring cell is not possible, then all the events between the latter are modified in such a manner that their movement markers indicate a short stop.

Thus, in an operation 400, a loop index i is reset to 0. Subsequently, in an operation 405, a test is carried out in order to determine whether the event of current index i is associated with a short stop or not. For as long as this test is negative, an operation 410 tests whether there remain at least three events (since the function is looking for at least one event between two events of the short-stop type), and, if this is the case, the index i is incremented in an operation 415 and the test of the operation 405 is repeated. If this is not the case, the function ends in an operation 499.

When an event whose movement marker indicates a short stop is found, a loop with two tests is launched in order to try to verify whether one of the two conditions hereinabove is met. For this purpose, in an operation 420, an index j equal to i is defined.

Subsequently, a loop begins in which two conditions are sought. If one of these two conditions is met, then the events situated between the two events outermost in time are modified so as to mark them as corresponding to a short stop.

Thus, in an operation 425, the least restrictive stop condition is tested, by comparing a time period T which indicates the difference between the time marker of the event of current index j and that of the event of index i. If the period T is less than this first threshold AC, then the index j is incremented in an operation 430. Then, in an operation 435, a test determines whether the event of index j indicates a movement or a short stop. If it is a movement event, then in an operation 440, a test determines whether the event of index j is the last or not. If this is the case, then the function ends with the operation 499. Otherwise, a time period T corresponding to the difference between the time marker of the event of index i and the event of index j is calculated in an operation 445, then the loop continues with the operation 425, until an event indicating a short stop is encountered in the operation 435.

When a second event indicating a short stop is found in the operation 435, a test in an operation 450 determines whether the time period T is shorter than a second threshold SMS. If this is the case, then the second condition (the most restrictive) is met, and in an operation 460, the function MStop( ) is called up with the indices i and j for modifying the movement markers of the events between these indices into short stops. Subsequently, a test is carried out in an operation 465 in order to determine whether there still remain 3 events in the list E[ ], as for the operation 410.

If this is not the case, then a test is carried out in an operation 455 for determining whether the events of indices i and j relate to the same localization cell. If this is the case, then the first condition is met, and in an operation 460 the function MStop( ) is called up with the indices i and j for modifying the movement markers of the events between these indices into short stops, then the test of the operation 465 is carried out.

If the test of the operation 455 is negative, then the loop continues with the operation 440 until the first condition is met or the time period T exceeds the first threshold AC, or the operation 440 indicates the end of the loop.

Lastly, when the test of the operation 465 is positive, then the index i is updated with the value of the index j (since the event of index j indicates a short stop) in an operation 470, and the loop continues with the operation 430.

The first threshold AC and the second threshold SMS are chosen such that AC is greater than SMS. The first threshold AC allows the case to be detected indicating a change of cell then a return to the original cell, whereas the time needed for that (the time corresponding to the first threshold AC) was not sufficient. Similarly, the second threshold SMS denotes an estimated time needed to go from one cell to another neighboring cell.

In the example described here, the first threshold AC is around 10 minutes, whereas the second threshold SMS is around 6 minutes. Thus, the function will transform into short stops the events associated with a movement included between two events associated with a short stop and separated by less than 6 minutes (second threshold SMS) or 10 minutes (first threshold AC).

Figure 5:
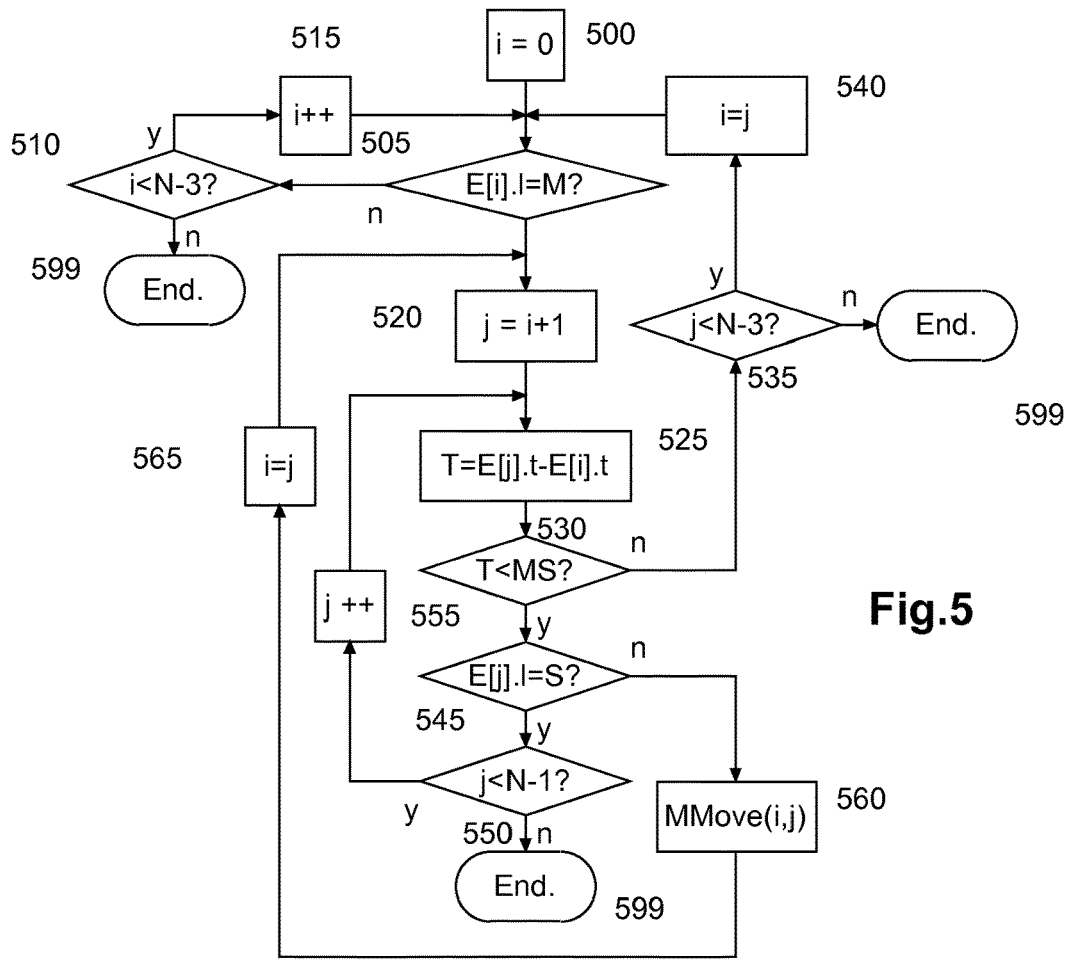

FIG. 5 shows another example of a function implemented by the analyzer 8. Indeed, when two events indicate a movement, and when these events are separated by a time period shorter than a third threshold indicating that short stop is not possible, then the intermediate events are modified such that their movement markers indicate a movement.

Thus, in an operation 500, a loop index i is reset to 0. Subsequently in operations 505, 510 and 515, similar to the operations 405, 410 and 415, the event of index i is tested and incremented until an event indicating a movement is found. The only difference is that the operation 405 tests whether the event is of the short-stop type, whereas the operation 505 tests whether the event is of the movement type.

Subsequently, a loop is launched in order to search for the event of index j whose movement marker indicates a movement and whose time marker indicates a time difference shorter than the third threshold MS when compared with the time marker of the event of index i.

Thus, in an operation 520, an index j is defined as equal to i plus 1, then, in an operation 525, a time period T between the time marker of the event of index j and the time marker of the event of index i is calculated.

Subsequently, in an operation 530, the time period T is compared with the third threshold in order to determine whether the latter is exceeded or not. If this is the case, then a test similar to that of the operation 510 is carried out in an operation 535. If this is the case, then the index i is updated with the index j in an operation 540, and the next event indicating a movement is sought with the operation 505. If this is not the case, then the function ends in an operation 599.

If the time period T is shorter than the third threshold, then, in an operation 545, a test determines whether the event of index j indicates a short stop. If this is the case, then, in an operation 550, a test determines whether this is the last operation in the list E. If this is the case, then the function ends with the operation 599. Otherwise, the index j is then incremented in an operation 555 and the loop continues with the operation 525 until a second event indicating a movement is found, or until the third threshold MS is exceeded.

When a second event indicating a movement is found in the operation 545, a function MMove( ) is executed in an operation 560. The function MMove( ) receives the indices i and j as arguments, in order to modify the movement markers of the events between these indices into movements. Lastly, in an operation 565, the index i is updated with j (since the event of index j indicates a movement), and the loop continues with the operation 520.

In the example described here, the third threshold MS is around 15 minutes. Thus, all the events associated with a short stop between two events associated with a movement and separated by less than 15 minutes. As a variant, the threshold MS could be greater, and for example could be one hour. In other words, this function amounts to considering that a short stop between two movements is not an anomaly if it lasts for a longer time than the third threshold MS.

Figure 6:
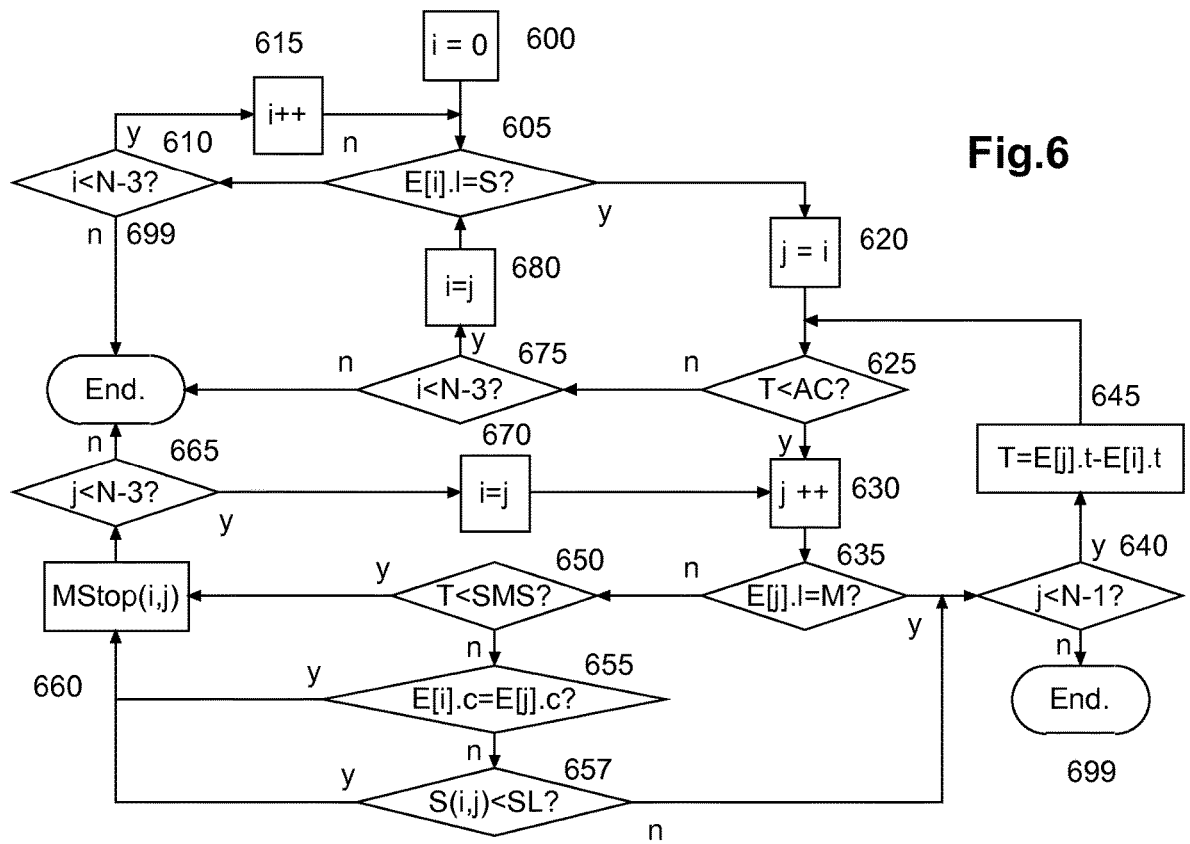

FIG. 6 shows another example of a function implemented by the analyzer 8. This function may be seen as a variant of the function shown in FIG. 4, or as a complement to the latter, which may for example be executed after the function in FIG. 5.

In this function, the structure is similar but the conditions sought are different:

the first condition, the least restrictive, differs in that the localization cells associated with the two events are not identical, the first threshold itself being identical and where the movement speed between the outer two short stops must be less than a threshold speed SL, the second condition is similar to the second condition of the function in FIG. 4, the second threshold being identical but the localization cells here must be identical.

Since the function in FIG. 6 is very close to that in FIG. 4, the numerical references have been kept identical, while adapting the hundred. In fact, only the operations 650 and 655 differ from the operations 450 and 455, an operation 657 being added.

The operation 650 tests the second condition, and the combination of the operations 655 and 657 tests the first condition. In practice, the first condition should not be met, given that it corresponds to the same first condition as for the function in FIG. 4, but it allows it to be ensured that the function in FIG. 5, or any other function previously executed, has not introduced any undesirable case.

The operation 657 tests whether the speed "as the crow flies" between the localization cells associated with the events of index i and j is less than a threshold speed SL of around 10 km/h. It is calculated by dividing the distance between the centers of the respective localization cells by the time between the two events. Thus, in the case where an event of the noise type (for example, if the communications mobile device connects itself to a very distant station by accident) could make the system think there has been a movement between the events i and j, this test allows it to be corrected. The operation 655 is accordingly not supposed to take place in practice, but, if it did occur, it avoids the speed having to be calculated in the operation 657 which represents a gain of precious time.

Once the analyzer 8 has executed the functions in FIGS. 3 to 6, it will simplify the resulting data so as to produce the trajectory data. For this purpose, the analyzer 8 will merge all the successive signaling data indicating a short stop, and associate them, for a total duration corresponding to the difference between the time markers of the outer events, with the most represented localization cell.

Figure 7:
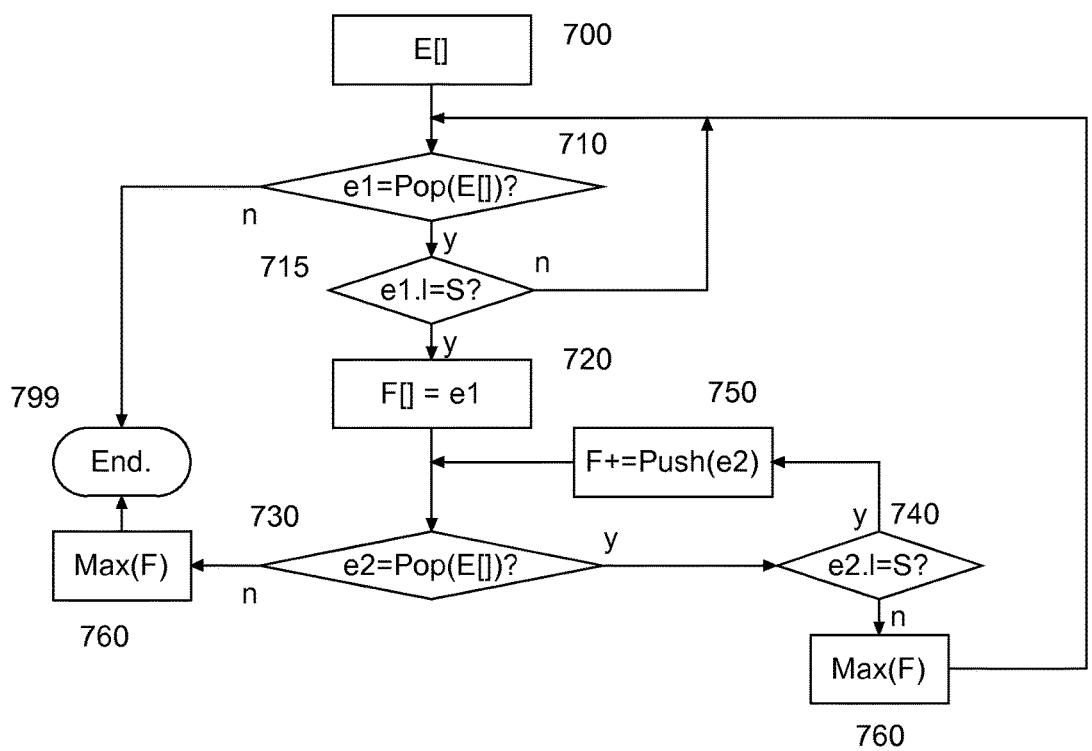

FIG. 7 shows one example of implementation of this function. Thus, in an operation 700, the list of events E[ ] modified as previously is used as a starting point.

Subsequently, a loop will break down this list and aggregate the events indicating a short stop, where necessary. For this purpose, in an operation 710, the list E[ ] is popped into an event e1. When the list is empty, the function ends in an operation 799. In an operation 715, a test determines whether the event e1 indicates a short stop. Where this is not the case, the operation 710 is repeated.

Subsequently, in an operation 720, a list F[ ] is initialized with e1. The list F[ ] will receive all the successive events indicating a short stop. In an operation 730, the list E[ ] is popped once again, this time into an event e2. If there is no event e2, then, in an operation 740, a test determines whether the event e2 relates to a short stop. If this is the case, then the event e2 is introduced into the list F[ ] in an operation 750, and the operation 720 is repeated. When the next event e2 that indicates a movement is found in the operation 740, or when the operation 730 indicates that the list E[ ] ends by a series of short stops, a function Max( ) receiving the list F[ ] as argument is executed in an operation 760. The purpose of this function Max( ) is to merge the events in the list F[ ], by choosing the localization cell the most represented in terms of duration in the list F[ ], and by summarizing all the events in this list into a single event whose duration corresponds to the difference between the outermost time markers of the list F[ ], associated with the chosen localization cell.

Thus, the trajectory data produced at the output of the analyzer 8 contain series of events indicating a movement and/or a single event indicating a short stop.

In the example described here, the analyzer executes the functions in FIGS. 3 to 7 sequentially and successively. Thus, the analyzer firstly executes the function in FIG. 3 on the whole of the data, then the function in FIG. 4 on the resulting data, etc. These successive functions allow the natural noise of the signaling data to be reduced and the amount of data to be reduced, by producing trajectory data which acquire a "meaning" linked to the notion of movement other than on foot.

The series of events which result from this are particularly advantageous because they exhibit a certain regularity which allows the journeys to be grouped together in order to establish statistics and/or to attach a series of events to a known itinerary. Moreover, they allow the noise inherent to the signaling data used as input to be greatly reduced, and also the quantity of calculations for the comparing between them to be reduced, by allowing significant episodes to be defined.

Thus, the trajectory data which are produced represent segments which represent a tangible movement, even if they do not perfectly correspond to the original signaling data. They constitute an abstraction of the signaling data which, by their nature which designates a movement or a short stop, allows the original signaling data to be segmented into meaningful episodes.

In addition, the notion of short stop allows an actual presence in a given location for a given period of time to be determined, which is almost impossible from signaling data alone. It furthermore becomes possible to compare trajectories with reference trajectories.

Lastly, the trajectory data constitute a form of compression of the signaling data: this makes possible calculations on large volumes of localization data. For example, the applicant has been able to reduce a volume of data associated with an airport of around 4 TB to only 100 GB. This reduction has allowed the processing of the trajectory data to be made possible, whereas this wasn't the case with the original mass of data, without adding a large number of servers.

Once the trajectory data 10 have been produced, the latter may be processed in order to classify the movements that they designate.

For this purpose, the extractor 12 and the detector 14 will process the trajectory data 10 so as to select the signaling data from the memory 4 that is relevant, and to extract from this classified movement data where this is possible.

Figure 8:
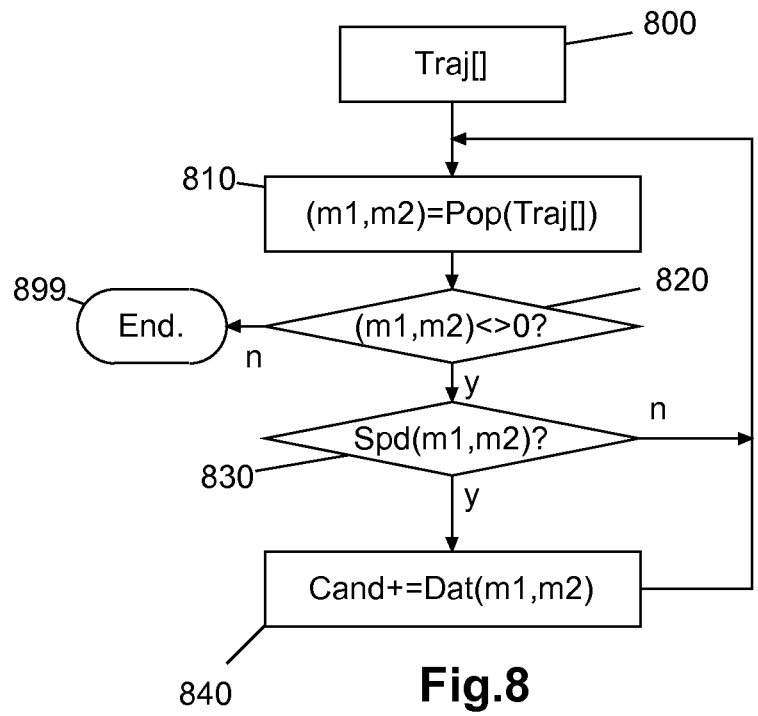
FIG. 8 shows one exemplary implementation of a function by the extractor in FIG. 1.

FIG. 8 shows one example of implementation of a function by the extractor 12.

In an operation 800, the function starts from trajectory data 10 that have been calculated. Subsequently, a loop is launched for processing the trajectory data in pairs.

Thus, in an operation 810, the trajectory data Traj[ ] are popped by means of a function Pop( ) which returns a pair of movement markers m1 and m2 which are associated with the same communications mobile device identifier and which have successive respective time markers.

In an operation 820, it is verified that the pair (m1,m2) is not empty. If this is the case, then all the trajectory data have been processed and the function ends in an operation 899.

When the pair is not empty, the extractor 12 executes a function Spd( ) in an operation 830. The function Spd( ) determines whether the time between the time markers exceeds a minimum period (for example 30 minutes), and compares the distance between the centers of the localization cells associated with the time markers with a distance threshold, for example 200 km.

If the function Spd( ) returns a positive result, then the movement designated by the pair (m1,m2) is a candidate which must be analyzed by the detector 14. For this purpose, in an operation 840, the extractor 12 executes a function Dat( ). The function Dat( ) receives as arguments the movement markers m1 and m2 and selects, in the memory 4, all the signaling data associated with the communications mobile device identifier corresponding to it and the time markers of which are included between the time markers of the movement markers m1 and m2. The result is stored in the form of a list in a candidate set Cand[ ] which receives all the sets of data extracted by virtue of the executions of the function Dat( ). The list stored in the candidate set Cand[ ] may also receive the time markers m1 and m2 concerned.

Once the operation 840 has ended, or when the function Spd( ) returns a negative result, the loop is repeated with the operation 810.

Once all the movements able to be classified have been determined and the relevant signaling data have been recovered from the memory 4, the detector 14 may be called up in order to analyze them and to determine those that are able to generate classified movement data.

Figure 9:
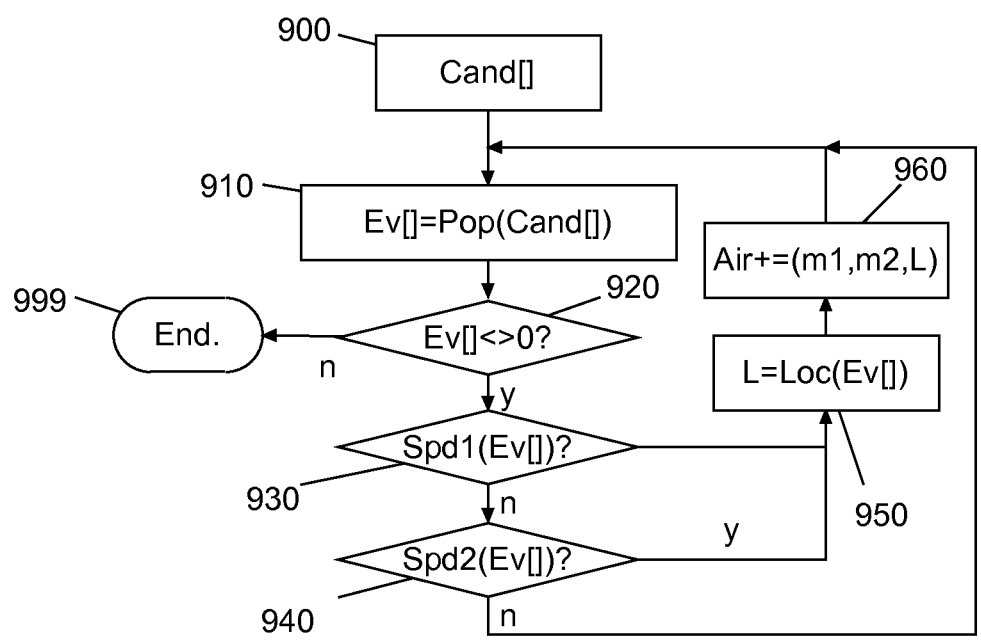
FIG. 9 shows one exemplary implementation of a function by the detector in FIG. 1.

FIG. 9 shows one example of implementation of a function by the detector 14 for this purpose.

In an operation 900, the detector 14 receives the candidate set determined by the extractor 12. Subsequently, a loop is launched for processing the trajectory data in pairs.

Thus, in an operation 910, the candidate set Cand[ ] is popped by means of a function Pop( ) which returns a list of signaling data Ev[ ] which has been determined with the function in FIG. 8.

In an operation 920, it is verified that the list Ev[ ] is not empty. If this is the case, then the candidate set has been processed and the function ends in an operation 999.

When the pair is not empty, the extractor 12 executes two functions Spd1( ) and Spd2( ) in operations 940 and 950. In the example described here, the operation 950 is carried out if the result of the operation 940 is negative. As a variant, the operations 940 and 950 could be carried out in a single operation or in parallel.

The function Spd1( ) and the function Spd2( ) represent two conditions by which the signaling data in the list Ev[ ] will be tested for determining whether the movement may be classified with classified movement data 16.

The function Spd1( ) has the role of testing the signaling data by pairs of time markers and of keeping the maximum speed (in other words, the distance between the centers of the localization cells for these signaling data divided by the duration between their respective time markers) over the whole of the data in the list Ev[ ], from amongst the pairs for which the time between the time markers exceeds 10 minutes. In the example described here, these pairs are formed by selecting, for each signaling data value, the signaling data value whose time marker is the closest while being separated by more than 10 minutes. This avoids taking into account pairs corresponding to an artifact, such as when a mobile device connects and disconnects itself successively to and from antennas in contiguous localization cells, but without there being a real movement. Other methods could be used for selecting pairs allowing the artifacts to be removed. Once this maximum speed has been determined, it is compared with a threshold speed, for example 350 km/h, and the function Spd1( ) returns a positive value if the maximum speed exceeds the threshold, and negative otherwise. This very high speed clearly indicates a journey by air transport, which will allow the movement to be classified as by air.

The function Spd2( ) has the role of testing the signaling data in the case where the list Ev[ ] contains a long period with no event, with very distant localization cells. This is typically the case when a telephone is switched off and/or is no longer registered with an antenna because it is at an altitude of 10,000 feet. Thus, if a user has switched off their telephone a long time before the plane takes off, or they do not quickly switch it back on after landing, the function Spd2( ) still allows the movement to be detected. Accordingly, the apparent speed between the two successive signaling data values could be lower than the threshold of the function Spd1( ), but nevertheless be considered as designating a movement by air whenever it is greater than 150 km/h for example.

The underlying idea of the function Spd2( ) is that only air transport has the consequence of an absence of events for a long period of time, for example greater than two hours, and with an apparent high speed. If the user were in a train or a car, there would be an event. In order to complete this determination, the function Spd2( ) may optionally analyze the localization cell of the signaling data slightly before the first time marker and slightly after the second time marker in order to determine whether a localization cell corresponds to an airport, which would finish the confirmation that the movement is by air.

If there is no successive signaling data separated by a time period greater than for example two hours and without network event or if the apparent speed is not greater than a speed of for example 150 km/h, then the function Spd2( ) returns a negative value. In the opposite case, if there are successive signaling data values separated by a time period greater than two hours and without network event and if the apparent speed is greater than for example 150 km/h, the function Spd2( ) returns a positive value.

When the function Spd1( ) or the function Spd2( ) returns a positive value, then a function Loc( ) is executed in an operation 950. The function Loc( ) starts from the signaling data having yielded the speed greater than for example 350 km/h in the case of the function Spd1( ) and successive signaling data values separated by a time period greater than two hours and without network event in the case of the function Spd2( ) and goes backwards and forwards in either direction from the latter by increasing and decreasing time markers until a localization cell is found in the signaling data which corresponds to an airport authority area. As a variant, if no localization cell corresponds to an airport authority area, the airport closest to the localization cells in the signaling data is retained. The two airports thus determined are stored in a variable L. Other data could be stored in the variable L, such as the flight times determined, the corresponding duration or the maximum speed detected on this journey.

Subsequently, in an operation 960, a function Air( ) creates the classified movement data by associating the time markers m1 and m2 with the origin of the list Ev[ ] and the airports of the variable L. As an option, the communications mobile device identifier may be attached, together with a value indicating that the itinerary involves air transport.

After that, or when the operations 940 and 950 both return a negative value, the loop is repeated with the operation 910.

This type of information is particularly useful for classifying the flows of transport and of people. In view of the growth of the traffic of goods and of people, this information, unavailable elsewhere, offers a considerable technical interest for the design of public infrastructures and also for the management of the commercial information associated with these flows.

Once the classified movement data have been determined, the function in FIG. 9 may be repeated in a recursive manner on each journey by air identified for handling the case where a journey comprises a stopover. Indeed, in the case of a Brest-Toulouse journey comprising a stopover in Paris, the latter is potentially poorly handled or ignored.

In order to overcome this problem, between two time markers m1 and m2 associated with a movement classified as by air, time markers n1 and n2 associated with the airports of the variable L are determined, and the operation in FIG. 9 is repeated between the time markers m1 and n1 and n2 and m2. If a movement by air is discovered in these segments, the operation is again repeated, until no additional movement by air is detected.

Moreover, in order to determine a localization cell in the signaling data which corresponds to an airport authority area, the detector 14 may be configured to determine, for each event, the speed between this event and an event taking place 15 minutes before or after, in order to determine whether the corresponding movement speed is less than a lower threshold, for example of the order of 50 km/h. If this is the case, then an airport authority area is sought within a small radius of the order of 50 km around the localization cell associated with this event.

The invention claimed is:

1. A trajectory determining device, comprising:
   a memory (4) for receiving signaling data associating communications mobile device identifiers, time markers and signaling identifiers, at least some of the signaling identifiers designating a localization cell,
   a classifier (6) capable, for a given communications mobile device identifier, of marking the signaling data associated with it with a movement marker indicating a state chosen from amongst a list comprising at least one movement and one short stop,
   an analyzer (8) capable of processing the signaling data marked according to the movement markers in order to produce trajectory data associating, on the one hand, a given communications mobile device identifier and, on the other, a series of movement markers each associated with a localization cell and with a time marker, such that two movement markers whose time markers indicate that they are consecutive denote distinct states, by applying at least one of the following rules:
   a) the modification of any given movement markers into movement markers indicating a short stop, when, for two movement markers indicating a short stop associated with a single localization cell, the number of movement markers whose time markers indicate that they are between these two movement markers is less than or equal to 4,
   b) the modification of movement markers indicating a movement into movement markers indicating a short stop when the time markers associated with them indicate that they are preceded and followed by movement markers indicating a short stop and when the time markers associated with the latter indicate a duration shorter than a first threshold,
   c) the modification of movement markers indicating a movement into movement markers indicating a short stop when the time markers associated with them indicate that they are preceded and followed by movement markers indicating a short stop which are associated with the same localization cell and when the time markers associated with the latter indicate a duration shorter than a second threshold,
   d) the modification of movement markers indicating a short stop into movement markers indicating a movement when the time markers associated with them indicate that they are preceded and followed by movement markers indicating a movement and when the time markers associated with the latter indicate a duration shorter than a third threshold,
   e) the merging of movement markers indicating a short stop whose time markers indicate that they are consecutive, and the association with the resulting movement marker of the localization cell associated with the movement markers whose time markers represent the longest duration and of a time marker corresponding to the sum of the durations of the associated time markers,
   an extractor (12) configured for determining, from amongst the trajectory data, pairs of movement markers associated with the same communications mobile device identifier the time markers of which and the associated localization cells of which define a duration exceeding a first threshold and a distance exceeding a second threshold, and, for a given pair of movement markers, for grouping into a candidate set the signaling data associated with the corresponding communications mobile device identifier and the time markers of which are included between the two time markers of the given pair of movement markers, a detector (14) configured for determining, within a given candidate set, whether signaling data associated with time markers meet one of the following conditions:

I) the signaling data define a movement speed greater than a third threshold, and the corresponding time markers are separated by a time period greater than a fourth threshold, II) the time markers of the signaling data are separated by a time period greater than a fifth threshold greater than the fourth threshold, the associated signaling identifiers indicate an absence of activity, the signaling data define a movement speed greater than the speed defined by the division of the first threshold by the second threshold, the detector (14) being configured, when one of the conditions I) and II) is met, for returning classified movement data (16) associating data on movement type and departure and arrival data determined from the localization cells associated with the signaling data and from a group of chosen locations.

2. The device as claimed in claim 1, wherein, when condition II) is met, the detector (14) is configured for verifying that the associated localization cells or those of signaling data the time markers of which are close in time designate a location belonging to a group of chosen locations before returning classified movement data (16).

3. The device as claimed in claim 1, wherein the classifier (6) and the analyzer (8) are configured so as to be called up sequentially for producing trajectory data.

4. The device as claimed in claim 1, wherein the analyzer (8) is configured for applying the rule a) before applying the rule b) and/or the rule b) before applying the rule c), and/or the rule c) before applying the rule d).

5. The device as claimed in claim 1, wherein the analyzer (8) is configured for applying one of the rules a), b), c) and d) before applying the rule e).

6. The device as claimed in claim 1, wherein the detector (14) is configured for determining whether one of the conditions I) and II) applies to signaling data situated between time markers associated with classified movement data, and for repeating this determination on the resulting classified movement data until neither of the conditions I) and II) is met.

7. A trajectory determining method comprising the following operations:

a) receive signaling data associating communications mobile device identifiers, time markers and signaling identifiers, at least some of the signaling identifiers designating a localization cell, b) for a given communications mobile device identifier, mark the signaling data associated with it with a movement marker indicating a state chosen from amongst a list comprising at least one movement and one short stop, c) process the signaling data marked according to movement markers in order to produce trajectory data associating, on the one hand, a given communications mobile device identifier and, on the other, a series of movement markers each associated with a localization cell and with a time marker, such that two movement markers whose time markers indicate that they are consecutive denote distinct states, by applying at least one of the following rules:

c1) the modification of any given movement markers into movement markers indicating a short stop, when, for two movement markers indicating a short stop associated with a single localization cell, the number of movement markers whose time markers indicate that they are between these two movement markers is less than or equal to 4, c2) the modification of movement markers indicating a movement into movement markers indicating a short stop when the time markers associated with them indicate that they are preceded and followed by movement markers indicating a short stop and when the time markers associated with the latter indicate a duration shorter than a first threshold, c3) the modification of movement markers indicating a movement into movement markers indicating a short stop when the time markers associated with them indicate that they are preceded and followed by movement markers indicating a short stop which are associated with the same localization cell and when the time markers associated with the latter indicate a duration shorter than a second threshold, c4) the modification of movement markers indicating a short stop into movement markers indicating a movement when the time markers associated with them indicate that they are preceded and followed by movement markers indicating a movement and when the time markers associated with the latter indicate a duration shorter than a third threshold, c5) the merging of movement markers indicating a short stop whose time markers indicate that they are consecutive, and the association with the resulting movement marker of the localization cell associated with the movement mark whose time markers represent the longest duration and of a time marker corresponding to the sum of the durations of the associated time markers, d) determine, from the trajectory data, pairs of movement markers associated with the same communications mobile device identifier the time markers of which and the associated localization cells of which define a duration exceeding a first threshold and a distance exceeding a second threshold, and, for a given pair of movement markers, for grouping into a candidate set the signaling data associated with the corresponding communications mobile device identifier and the time markers of which are included between the two time markers of the given pair of movement markers, e) determine, within a given candidate set, whether signaling data associated with time markers meets one of the following conditions:

I) the signaling data define a movement speed greater than a third threshold, and the corresponding time markers are separated by a time period greater than a fourth threshold, II) the time markers of the signaling data are separated by a time period greater than a fifth threshold greater than the fourth threshold, the associated signaling identifiers indicate an absence of activity, the signaling data define a movement speed greater than the speed defined by the division of the first threshold by the second threshold, f) when one of the conditions I) and II) is met, return classified movement data (16) associating data on movement type and departure and arrival data determined from the localization cells associated with the signaling data and from a group of chosen locations.

8. The method as claimed in claim 7, wherein the condition II) further comprises verifying that the associated localization cells or those of signaling data the time markers of which are close in time designate a location belonging to a group of chosen locations before returning classified movement data (16).

9. The method as claimed in claim 7, wherein the operation c) applies the rule c1) before the rule c2), and/or the rule c2) before applying the rule c3), and/or the rule c3) before applying the rule c4).

10. The method as claimed in claim 7, wherein the operation c) applies one of the rules c1), c2), c3) and c4) before applying the rule c5).

11. The method as claimed in claim 7, wherein the operations c), d), e) and f) are carried out in this order.

12. The method as claimed in claim 7, wherein the operation e) is repeated on signaling data situated between time markers associated with classified movement data, and also on the resulting classified movement data, until neither of the conditions I) and II) is met.

* * * * *